United States Patent
Baehl et al.

(10) Patent No.: US 6,648,337 B1
(45) Date of Patent: Nov. 18, 2003

(54) BACKUP RING WITH CONTROLLED SPACING

(75) Inventors: Jeff Baehl, Fort Wayne, IN (US); Larry J. Castleman, New Haven, IN (US)

(73) Assignee: Polymer Sealing Solutions, Inc., Fort Wayne, IN (US)

( * ) Notice: Subject to any disclaimer, the term of this patent is extended or adjusted under 35 U.S.C. 154(b) by 0 days.

(21) Appl. No.: 09/439,947

(22) Filed: Nov. 12, 1999

Related U.S. Application Data

(60) Provisional application No. 60/108,797, filed on Nov. 14, 1998.

(51) Int. Cl.[7] .............................. F16J 15/16; F16J 15/54
(52) U.S. Cl. ....................................... 277/584; 277/589
(58) Field of Search .................................. 277/584, 589

(56) References Cited

U.S. PATENT DOCUMENTS

| | | | | |
|---|---|---|---|---|
| 2,456,356 A | * | 12/1948 | Aber ........................... | 277/584 |
| 2,494,598 A | * | 1/1950 | Waring ........................ | 277/584 |
| 2,843,434 A | * | 7/1958 | Orloff et al. ................. | 277/584 |
| 3,215,441 A | * | 11/1965 | Hoevereid .................... | 277/584 |
| 3,716,245 A | * | 2/1973 | Turolla ........................ | 277/584 |
| 4,349,205 A | * | 9/1982 | McGee et al. ............... | 277/584 |
| RE31,171 E | * | 3/1983 | Brent .......................... | 277/584 |
| 4,411,439 A | * | 10/1983 | Couvillion et al. ......... | 277/584 |
| 4,440,404 A | * | 4/1984 | Roach et al. ................ | 277/584 |
| 4,483,543 A | * | 11/1984 | Fisher, Jr. et al. .......... | 277/584 |
| 4,489,953 A | * | 12/1984 | Witt ............................ | 277/584 |
| 4,893,823 A | * | 1/1990 | Strouse et al. .............. | 277/584 |
| 5,975,538 A | * | 11/1999 | Krause et al. ............... | 277/584 |
| 6,173,968 B1 | * | 1/2001 | Nelson et al. ............... | 277/584 |

* cited by examiner

*Primary Examiner*—Anthony Knight
*Assistant Examiner*—Michael J. Kyle
(74) *Attorney, Agent, or Firm*—Randall J. Knuth

(57) ABSTRACT

A backup ring is provided adjacent a seal apparatus for delivering a controlled space between two relatively moving parts. The backup ring provides protection against seal extrusion and failure, and can provide an auxiliary seal when needed. The backup ring includes either an arcuate surface that deforms under pressure, or a cantilever portion that deforms under pressure, or both.

27 Claims, 5 Drawing Sheets

BACKUP RING WITH CONTROLLED SPACING

CROSS-REFERENCE TO RELATED APPLICATIONS

This application relates to and claims the benefit under 35 U.S.C. §119 of Provisional Application Ser. No. 60/108,797 filed Nov. 14, 1998 by the same inventors.

BACKGROUND OF THE INVENTION

1. Field of the Invention

The present invention relates to a backup ring and more particularly to a backup ring having a convex shape and/or cantilever portion for providing a controlled space between the backup ring and a relatively moving part when in a pressurized state.

2. Description of the Related Art

Sealing devices between two relatively moving parts are well known in the art. When the two moving parts include a shaft and a concentric housing, the sealing device typically comprises a first annular seal ring, and an energizer ring working in combination with the seal. Both the seal ring and the energizer ring are typically disposed in a gland or a groove carved into the housing, and face the rotatable shaft to form a sealing relationship with the shaft. Some sealing arrangements provide for only a seal to be used as the sealing device. However, if both a seal ring and an energizer ring are used, the seal ring is generally disposed adjacent the rotatable shaft, and the energizer ring disposed along the opposing bottom of the gland or groove.

Often, a seal ring serves to retain lubrication fluid on one side of the seal, preventing the leakage of that fluid even in pressurized states. However, under operation, and especially when high-pressure fluids are involved, a seal ring has a potential to extrude from its position in the gland. This condition, known as a seal blow-out, can halt the operation of the shaft, damage the shaft and housing, and proximately cause significant secondary damage, depending on the application of the shaft and housing.

In part to alleviate the potential for seal extrusion, a backup ring is utilized in many sealing device applications in the art. The backup ring is disposed along the gland wall that carries the seal device during operation. It is common during operation, especially in high-pressure fluid applications, for a seal to shift toward one side of the gland, thereby exerting most of its lateral pressure on a wall of the gland. It is at this time that the potential for seal extrusion is highest.

Placing a backup ring between the sealing device and that gland wall provides a means for further securing the sealing device inside the gland. This is accomplished by providing a seal ring having a concentric annular hole that is either sized to fit around the diameter of the rotating shaft, or it is slightly larger. Physical properties such as elastomeric properties and design tolerances allow the backup ring to substantially prevent seal failure and seal extrusion.

However, it is a potential disadvantage of current backup rings that when a shaft-contacting backup ring is utilized, the system is subjected to additional friction due to the contact between the shaft and the backup ring.

Alternatively, when radially spaced backup rings are used, less protection against seal extrusion is provided, and a means must be implemented in order to engage the backup ring with the shaft thereby preventing fluid leakage. Furthermore, due to varying design tolerances and varying pressures within a pressurized system, an optimal clearance between the backup ring and the shaft is not always consistently achieved.

SUMMARY OF THE INVENTION

The present invention pertains to a seal arrangement for sealing a gap between two relatively moving parts, such as a shaft and a housing that is concentric with the shaft. While the following descriptions pertain to a shaft relatively moving within a housing, the present invention is not limited by such an embodiment, and other configurations for two relatively moving parts are within the scope of this disclosure.

A seal arrangement is typically comprised of a primary seal apparatus that is disposed within a gland located between the shaft and the housing, and a backup ring that is disposed between the primary seal apparatus and a wall of the gland. It should be noted that while the following description discloses a preferred embodiment having a gland defined within the housing, it is within the scope of the present invention to have a gland defined in the shaft, wherein the primary seal apparatus and backup ring face the housing and form a sealing relationship therebetween.

The present invention, in one form thereof, comprises a backup ring for providing auxiliary sealing to a primary seal arrangement disposed between a first member having a first contact surface and a second member having a second contact surface, the backup ring comprises a washer shaped member having a perimeter in contact with the first contact surface, the washer having a convexly shaped portion. According to the invention, the convex shape is deflected when subjected to pressure, such that it extends the member into a more linear shape or otherwise changes its shape in a controlled manner, thereby either closing out or opening the seal clearance to a desired gap.

The present invention, in another embodiment thereof, further comprises a generally arcuate cantilever portion extending from the perimeter of the washer. As disclosed in the invention, the cantilever portion extends at an angle from the plane defined by the washer during an unpressurized state, and when pressurized, deforms into a position disposed between a surface of the gland and the primary seal arrangement such that the cantilever portion extends substantially perpendicularly from the plane defined by the washer.

The present invention, in another form thereof, comprises a seal arrangement for sealing a gap between a shaft and a housing, the seal arrangement having a pressurized state and a non-pressurized state, the seal arrangement comprising a primary seal apparatus disposed within a gland between the shaft and the housing, and a backup ring disposed between the primary seal apparatus and a wall of the gland, the backup ring extending substantially radially between the shaft and a gland bottom, and having a convex portion in the non-pressurized state.

The present invention, in yet another form thereof, comprises a method of sealing and gap between a first member and a second member comprising the steps of: providing a primary seal arrangement disposed between the first member and the second member, and providing a backup ring disposed between the first member and the second member adjacent to the primary seal arrangement, the backup ring having a convexly shaped portion that deflects when subject to compressive forces.

The present invention, in a further embodiment thereof, comprises a backup ring disposed between a first member having a first contact surface and a second member having a second contact surface, the backup ring comprising a washer having a cantilever portion extending from the washer at an angle from a plane substantially defined by the washer. According to this embodiment of the invention, the cantilever portion extends at an angle from the plane substantially defined by the washer when the system is in an non-pressurized state, and is deformed into a configuration wherein the cantilever portion extends substantially perpendicularly from the plane defined by the washer in a pressurized state.

During an unpressurized state of the present invention, a primary seal apparatus contacts the shaft on an inner surface of the seal apparatus, and contacts the gland bottom on an outer surface of the said apparatus. The primary seal apparatus may only include a seal ring, or it may include a seal ring and an energizer, the energizer circumscribing the seal ring. In either case, the backup ring is placed adjacent the seal arrangement, such that it is disposed between the primary seal apparatus and a gland wall, on a non-pressurized side of the primary seal apparatus.

In one embodiment of the present invention, the backup ring maintains a convex shape during a non-pressurized state, while being radially spaced from the outer surface of the shaft. However, during a pressurized state, the primary seal apparatus exerts pressure on the backup ring in an axial direction, thereby deforming and radially elongating the backup ring, and consequently encouraging the inner surface of the backup ring to move closer to the shaft. Depending on the application, the backup ring can be designed to engage and seal the shaft during a pressurized state, or provide an optimal clearance between the shaft and the backup ring during the pressurized state.

It is an advantage of the present invention that the backup ring, in one form thereof, provides a substantially frictionless convex shaped design during periods of low pressure operation and provides a selectable positioning with relation to the shaft during a high-pressure state, when the likelihood of seal failure or extrusion is greatest.

It is a further advantage of the present invention, in one form thereof, that the wear on the backup ring during normal operation is greatly reduced because of the clearance provided between the shaft and the backup ring when it is in its convex shape.

It is a further advantage of one embodiment of the present invention that extrusion of the primary seal apparatus and the backup ring is further minimized by the providing a consistently achievable clearance between the backup ring and the shaft.

Yet another advantage of this embodiment is that the axially protruding lip portion provides for a lifting of the backup ring from the shaft, thereby reducing friction and wear.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
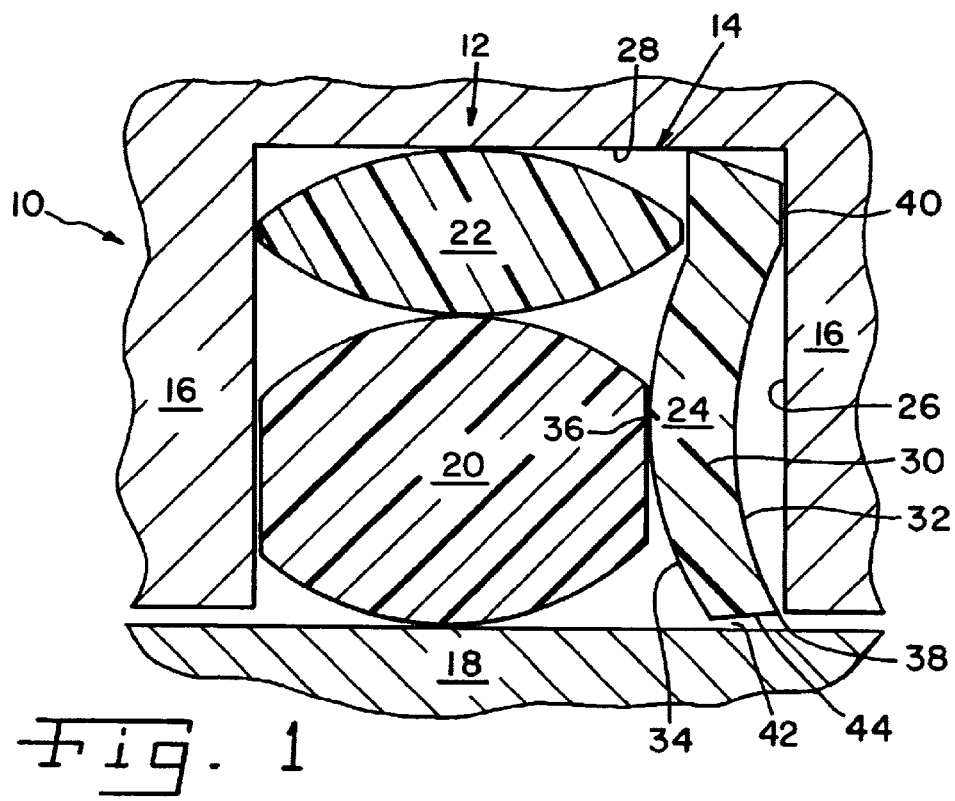
FIG. 1 is a sectional view on an axial plane illustrating one form of the invention.

Referring now to the drawings and particularly to FIG. 1, there is shown a typical seal arrangement 10 which includes a primary seal apparatus 12 disposed within a gland 14 for creating a sealing relationship between a first member 16 and a second member 18 having motion relative to each other.

In one embodiment of the invention, as shown in FIG. 1, gland 14 is defined within first member 16, facing second member 18. Although the preferred embodiment describes first member 16 as a shaft housing that has a concentric relationship with a shaft, second member 18, other configurations and placements for the gland 14 are within the scope of the invention. For example, gland 14 could be defined within second member 18, whereby primary seal apparatus 12 is arranged to be facing first member 16, and first member 16 and second member 18 could have planar or other geometries.

While primary seal apparatus 12 is shown in FIG. 1 to include a seal ring 20 and an energizer ring 22, the present invention may alternately utilize only a seal ring as the primary seal apparatus 12, thereby omitting energizer ring 22.

The invention, in its most important portion, further comprises backup ring 24 disposed between primary seal apparatus 12 and wall surface 26 of gland 14. Backup ring 24 can be composed of polytetrafluoroethylene, or any other elastomeric compound that provides a deformable medium, such as thermoplastics or thermosets including, but not limited to UHMWPE or thermoset, Nylon, polyetheretherketone, polyphenylsulfide, phenolic, epoxy, thermoplastic elastomer, and polyurethane.

According to the embodiment of the invention as disclosed in FIG. 1, backup ring 24 extends radially between second member 18 and a bottom surface 28 of gland 14. In an unpressurized state, the backup ring 24 of FIG. 1 maintains a convexly shaped portion 30 having an inner arcuate surface 32 and outer arcuate surface 34. In an unpressurized state, backup ring 24 contacts primary seal apparatus 12 along at least one contact surface 36 disposed on outer arcuate surface 34 of backup ring 24, and contacts first member wall surface 26 at contacts 38, 40. Importantly, backup ring 24 is disposed and constructed such that in an unpressurized state, a clearance 42 is left between inner contact surface 44 of backup ring 24 and a perimeter of second member 18, the clearance 42 providing for frictionless relative movement between first member 16 and second member 18, at least with respect to backup ring 24. Additionally, during an unpressurized state, backup ring 24 is not subjected to wear as would be expected if it were in constant contact with second member 18.

Figure 2:
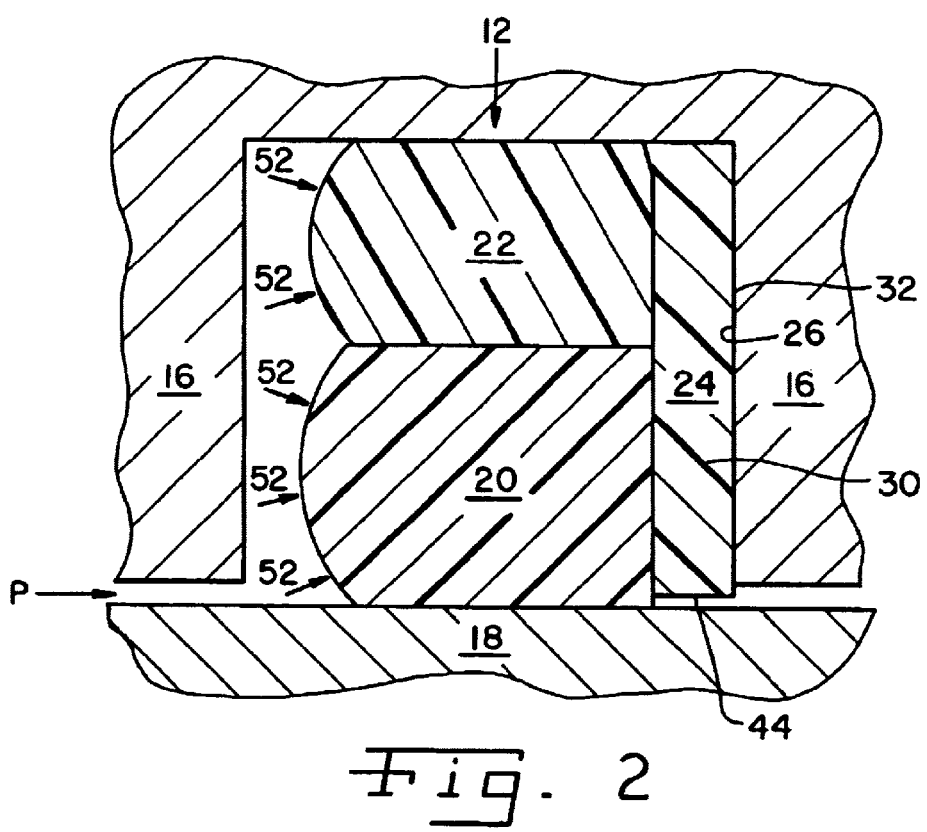
FIG. 2 is a sectional view of the invention of FIG. 1 in a pressurized state.

FIG. 2 depicts the embodiment of FIG. 1 in a pressurized state, wherein fluid pressure is being introduced into the system through passageway P. As indicated by the arrows 52 depicting pressure, a pressurized state is characterized by internal fluid pressure on seal ring 20 and energizer ring 22, the pressure shifting seal ring 20 and energizer ring 22 toward backup ring 24, causing convexly shaped portion 30 to deflect into a more linear and extended shape. As pressure in the system increases, inner arcuate surface 32 is forced closer to wall surface 26, and backup ring 24 radially expands, causing inner contact surface 44 of backup ring 24 to come in close proximity with outer surface of second member 18. If desired in the application, backup ring 24 can be designed to close the gap between inner contact surface 44 and second member 18 when pressurized.

Furthermore, backup ring 24 can be manufactured with different tolerances and materials, such that the pressure range at which deflection occurs is appropriate for the particular application. For instance, if it is desirable in the application to have backup ring 24 become substantially linear at a lower pressure, a more elastomeric compound can be used, and/or a backup ring 24 with a smaller thickness or different geometries can be used.

As pressure increases in the system and backup ring 24 becomes more linear, its relationship with second member 18 and more particularly seal ring 20 substantially prevents primary seal apparatus 12 from extruding. This is caused by the controllability or close out of the clearance space between backup ring 24 and second member 18. Additionally, backup ring 24 can provide a secondary seal in the event that the primary seal apparatus 12 fails or leaks in some manner.

As disclosed above, backup ring 24 can be designed with varying geometries, thicknesses, and compositions, such that a variety of applications may be served. For example, an application requiring a minimum radial clearance of 0.010 inch between backup ring 24 and second member 18 would have a certain geometry, composition, and specifications. In contrast, an application requiring the backup ring to close the radial clearance to a 0.002 inch clearance in the same gland would likely provide either more elastomeric properties, larger dimensions, or a slightly differing geometry, such as one in which inner the arcuate surfaces 32, 34 are altered to have a different arcuate curvature. Additionally, backup ring 24 can be provided with physical characteristics and properties that enable it to sealingly engage with second member 18 during extreme high-pressure conditions, thereby providing maximum protection against seal extrusion and failure.

In an alternative embodiment of the invention, a method of sealing a gap between a first member and a second member is provided, the method comprising the steps of providing a primary seal arrangement disposed between the first member and the second member, and providing a backup ring between the first member and the second member and adjacent the primary seal apparatus, wherein the backup ring has a convexly shaped portion for permitting deflection when subjected to compressive forces.

Figure 3:
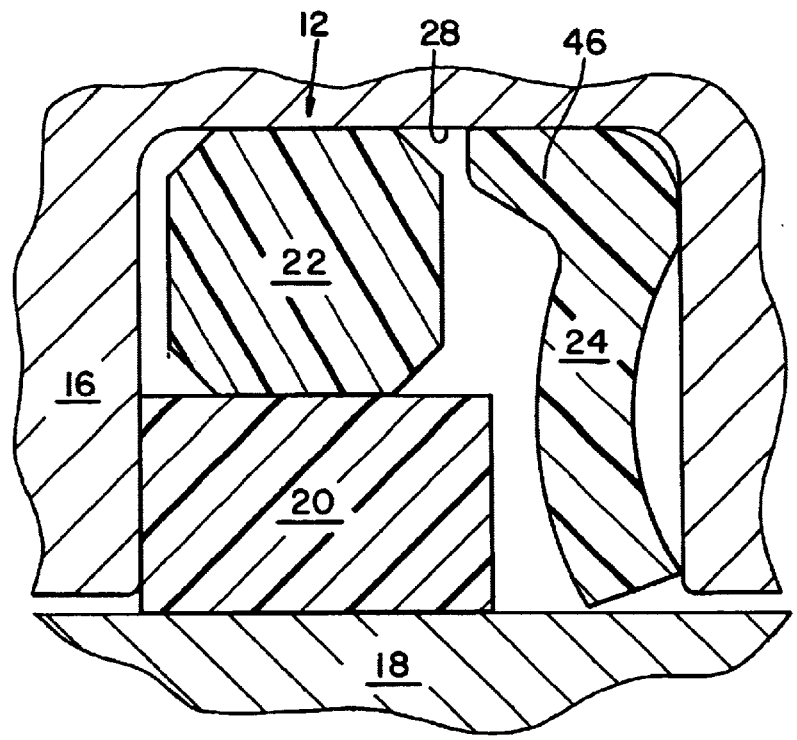
FIG. 3 is a sectional view of another embodiment of the present invention wherein a cantilever portion is provided in addition to a concave surface.

Another alternative embodiment of the invention is shown in FIG. 3, wherein backup ring 24 further comprises a cantilever portion 46. According to this embodiment of the invention, cantilever portion 46, during a non-pressurized state, extends at an angle from backup ring 24. Under pressurization, primary seal apparatus 12 presses against backup ring 24 thereby forcing cantilever portion 46 against bottom surface 28, and deforming it such that it extends substantially perpendicularly from backup ring 24. By providing a cantilever portion 46, this embodiment offers a consistent placement of backup ring 24 with relation to primary seal apparatus 12, thereby consistently achieving the desired spaced relationship between backup ring 24 and second member 18.

Figure 4:
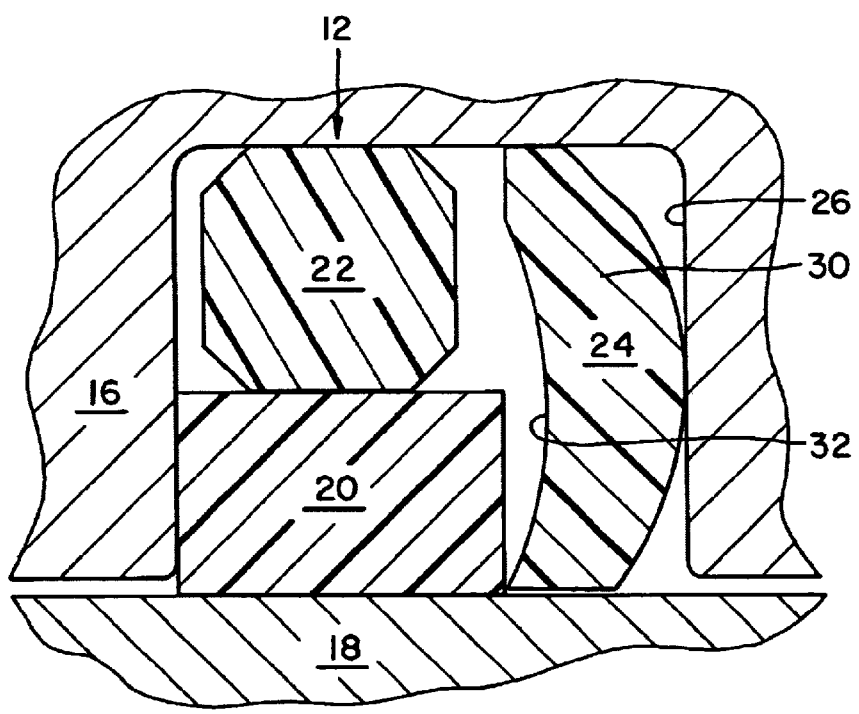
FIG. 4 is a sectional view of another embodiment of the present invention wherein the backup ring forms a concave surface facing toward the seal element.

The present invention, in another form thereof, is shown in FIG. 4 to have a backup ring 24 with a convexly shaped portion 30 that has an inner circumference 32 that faces toward the primary seal apparatus 12. In this embodiment, the operation of the backup ring 24 remains substantially the same as the above-discussed embodiments, wherein backup ring 24 deflects into a substantially linear or extended shape when the system is exposed to increased pressure. As pressure increases and backup ring 24 deflects, a predetermined gap is defined between backup ring 24 and second member 18, thereby substantially preventing the extrusion of primary seal apparatus 12.

Figure 5:
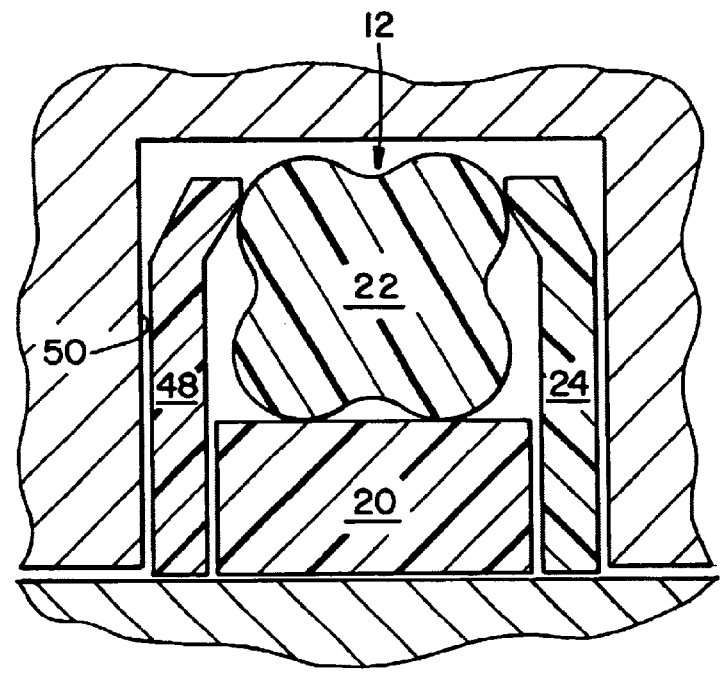
FIG. 5 is a sectional view of an embodiment of the invention wherein two backup rings are provided.

Yet another embodiment of the invention is shown in FIG. 5, wherein a second backup ring 48 is disposed between primary seal apparatus 12 and a second wall surface 50. A second backup ring 48 may be used in applications where it is desirable to have additional sealing, despite the fact that additional friction will result during a pressurized state.

Figure 6:
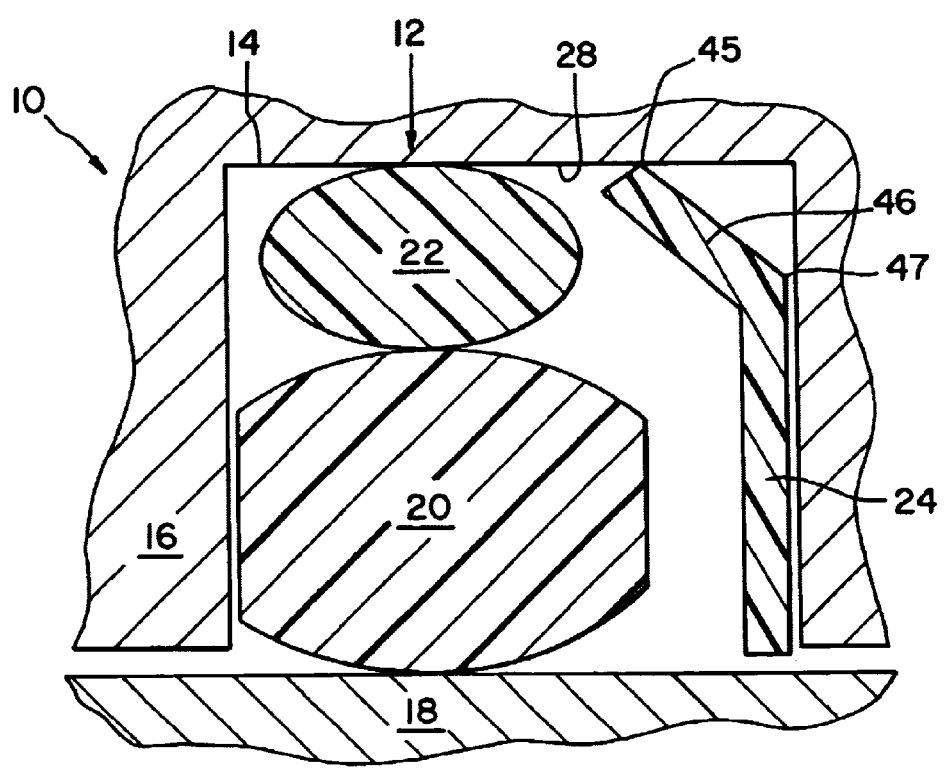
FIG. 6 is a sectional view of an embodiment of the invention wherein a cantilever portion is provided.

FIG. 6 shows yet another embodiment of the present invention wherein backup ring 24 comprises a washer having a cantilever portion 46 that extends from the washer at an angle from a plane substantially defined by the washer. During a non-pressurized state, the angle at which the cantilever portion 46 extends from the washer causes cantilever tip 45 to touch bottom surface 28 of gland 14 while simultaneously leaving a gap between corner 47 of backup ring 24 and the bottom surface 28 of gland 14.

Figure 7:
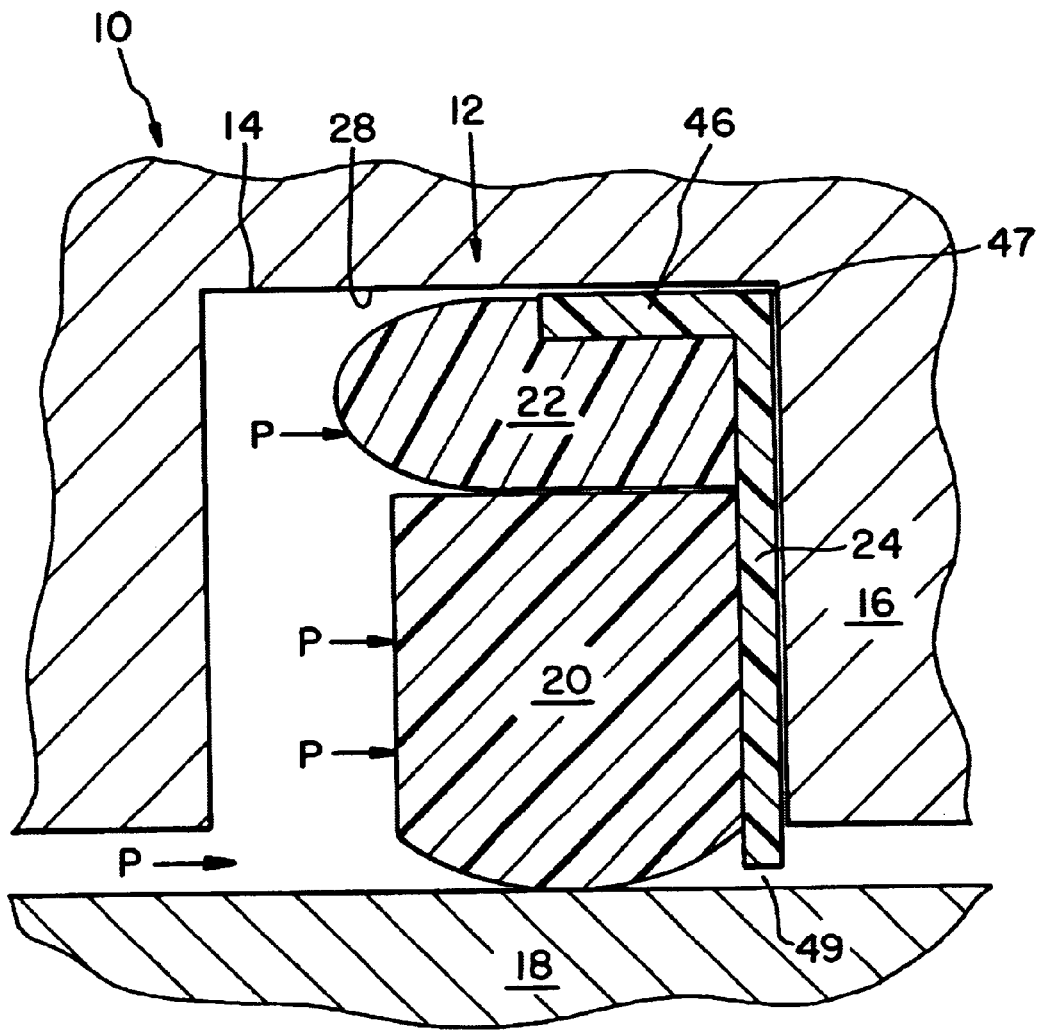
FIG. 7 is a sectional view of the embodiment of FIG. 6 during a pressurized state.

When the embodiment of FIG. 6 is subjected to pressure (indicated by arrows "P"), as depicted in FIG. 7, primary seal apparatus 12 presses against backup ring 24, thereby forcing corner 47 against bottom surface 28, and consequently deforming cantilever portion 46 such that it extends substantially perpendicularly from the washer-shaped backup ring 24. As corner 47 is forced against bottom surface 28, backup ring 24 "lifts" away from second member 18, providing a small gap 49 between backup ring 24 and second member 18. Gap 49 provides for a frictionless relationship between backup ring 24 and second member 18, while simultaneously preventing extrusion of primary seal apparatus 12. Furthermore, during the pressurized state, cantilever portion 46 is fixedly disposed between primary seal apparatus 12 and first member 16 because of the pressure imparted by primary seal apparatus 12, resulting in increased anti-extrusion properties.

Figure 8:
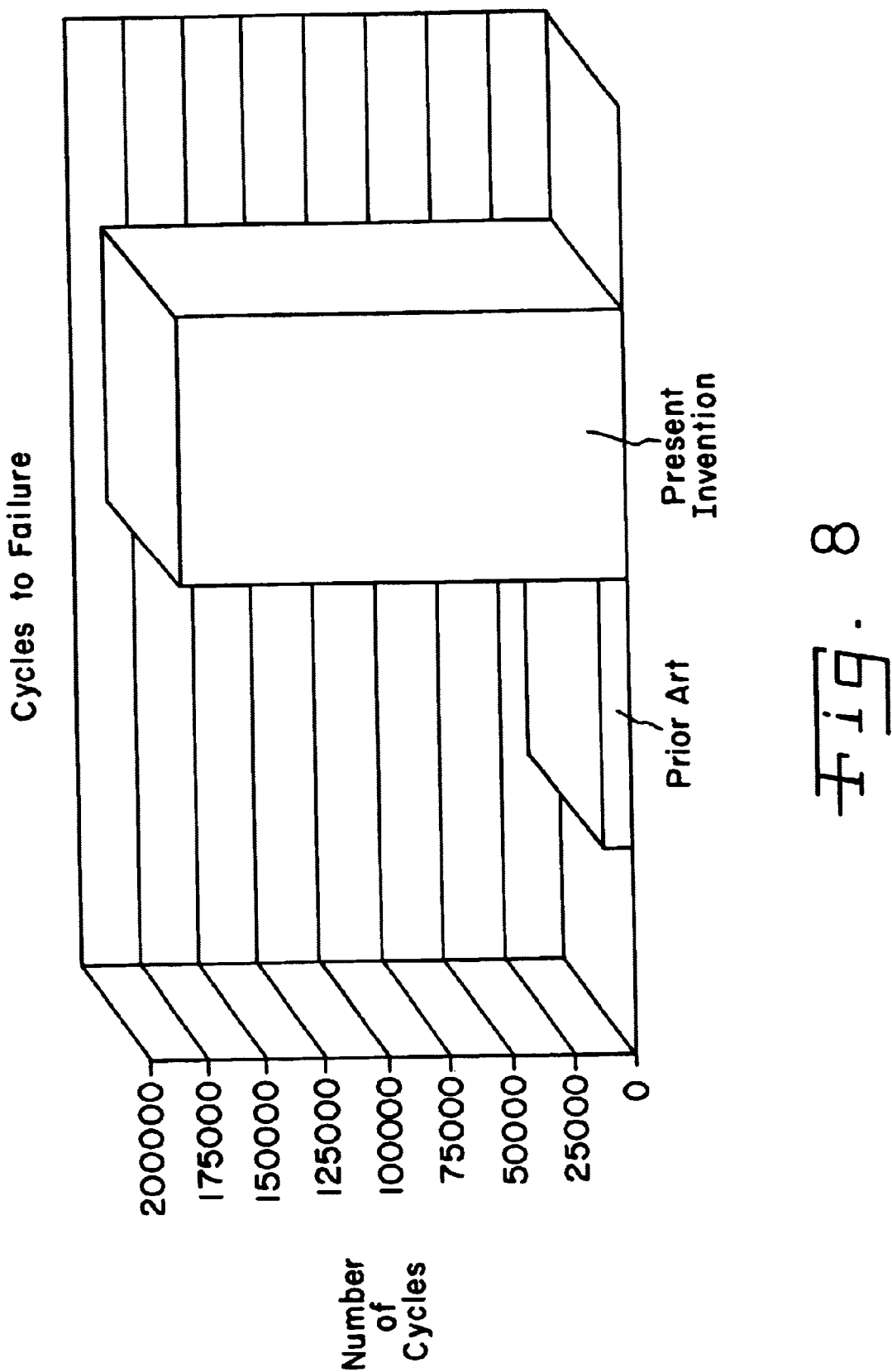
FIG. 8 shows the results of a finite element analysis comparing the prior art seal arrangement to the present invention.

FIG. 8 shows the advantages of the embodiment of the present invention having a backup ring with a cantilever portion, using results of finite element analysis to compare the prior art seal arrangement to the present invention. The analysis was conducted under high pressure with rotary motion.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A backup ring for providing auxiliary sealing to a primary seal arrangement disposed between a first member having a first contact surface and a second member having a second contact surface, said backup ring comprising:

a washer having a perimeter in contact with the first contact surface, said washer having a convexly shaped radial cross section, said convexly shaped radial cross section including a first arcuate washer surface and an opposed second arcuate washer surface, one of said first arcuate washer surface and said second arcuate washer surface facing the second surface, said one of said first arcuate washer surface and said second arcuate washer surface extensively contacting the second contact surface only when the seal is pressurized.

2. The backup ring of claim 1, wherein said washer responds to pressure applied in a first direction by expanding in a second direction.

3. The backup ring of claim 2, wherein said second direction is substantially perpendicular to said first direction.

4. The backup ring of claim 1, wherein said washer is disposed within a seal gland defined in the first contact surface of the first member, said seal gland having an inner surface.

5. The backup ring of claim 4, wherein said washer is disposed between the primary seal arrangement and the inner surface of the seal gland.

6. A backup ring for providing auxiliary sealing to a primary seal arrangement disposed between a first member having a first contact surface and a second member having a second contact surface, said backup ring comprising:
a washer having a perimeter in contact with the first contact surface, said washer having a convexly shaped radial cross section, generally arcuate cantilever portion extending from said perimeter of said washer.

7. The backup ring of claim 1, wherein said washer is spaced from the second member when said washer is in a nonpressurized state.

8. The backup ring of claim 1, wherein said washer provides a sealing contact with the second member when said washer is in a pressurized state.

9. The backup ring of claim 1, wherein said washer provides a controlled spaced relationship with the second member when said washer is in a pressurized state.

10. A seal arrangement for sealing a gap between a shaft and a housing concentric with the shaft, said seal arrangement having a pressurized state and a non-pressurized state, said seal arrangement comprising:
a primary seal apparatus disposed within a gland between the shaft and the housing; and
a backup ring disposed between said primary seal apparatus and a wall of said gland, said backup ring extending substantially radially between said shaft and a gland bottom and having a convex portion in the non-pressurized state, said backup ring including a cantilever portion, said cantilever portion extending at an acute angle from the backup ring and disposed between said primary seal apparatus and said gland, wherein said cantilever portion becomes substantially perpendicular to said backup ring plane in the pressurized state, thereby providing a controlled clearance between said shaft and said backup ring.

11. The seal arrangement of claim 10, wherein said gland is disposed within the housing and faces the shaft.

12. The seal arrangement of claim 10, wherein said backup ring deflects in a substantially radially inward direction when in the pressurized state.

13. The seal arrangement of claim 10, wherein said backup ring is radially spaced from the shaft when said seal arrangement is in the non-pressurized state.

14. The seal arrangement of claim 10, wherein said backup ring sealingly engages with the shaft when said seal arrangement is in the pressurized state.

15. The seal arrangement of claim 10, wherein an inner arcuate surface of said convex portion of said backup ring is adjacent said primary seal apparatus.

16. The seal arrangement of claim 10, wherein an outer arcuate surface of said convex portion of said backup ring is adjacent said primary seal apparatus.

17. The seal arrangement of claim 10, wherein a second backup ring is provided, said second backup ring being disposed between said primary seal apparatus and a second wall of said gland.

18. A method of sealing a gap between a first member and a second member, comprising the steps of:
providing a primary seal arrangement disposed between the first member and the second member;
providing a backup ring disposed between the first member and the second member and adjacent said primary seal arrangement, said backup ring having a first backup ring surface adjacent the second member, said backup ring having a convexly shaped portion that deflects when subjected to compressive forces; and
pressurizing the primary sealing arrangement, thereby moving said first backup ring surface, in its entirety, away from the second member.

19. The method of claim 18, wherein said backup ring further comprises a cantilevered portion disposed at an angle from a plane defined by said backup ring.

20. The method of claim 19, wherein said cantilevered portion becomes substantially perpendicular to said backup ring plane when subjected to compressive forces, thereby providing a controlled space between said backup ring and said second member.

21. The method of claim 18, wherein said backup ring is spaced from the second member when no compressive forces are applied.

22. The method of claim 18, wherein said convexly shaped portion of said backup ring becomes more planar when said backup ring is subjected to compressive forces.

23. The method of claim 18, wherein said convexly shaped portion has an inner surface adjacent said primary seal arrangement.

24. The method of claim 18, wherein said convexly shaped portion has an outer surface adjacent said primary seal arrangement.

25. A backup ring disposed between a first member having a first contact surface and a second member having a second contact surface, said backup ring comprising:
a washer having a cantilever portion, said cantilever portion of said washer being associated with the first contact surface of the first member, said cantilever portion extending from said washer at an angle from a plane substantially defined by said washer, said washer having a controlled spacing with the second contact surface of the second member, said controlled spacing being based on applied pressure, said cantilever portion moving so as to approach a substantially perpendicular angle from said washer when compressive forces are applied to said backup ring, such said moving of said cantilever portion causing an increase in said controlled spacing.

26. The backup ring of claim 25, wherein a controlled space is provided between said backup ring and said second member contact surface when compressive forces are applied.

27. The backup ring of claim 25, wherein said washer is disposed between the primary seal arrangement and the inner surface of the seal gland.

* * * * *